United States Patent
Ams

(10) Patent No.: US 8,310,196 B2
(45) Date of Patent: Nov. 13, 2012

(54) METHOD AND APPARATUS FOR FAILSAFE MONITORING AN ELECTROMOTIVE DRIVE

(75) Inventor: Mathias Ams, Waldkirch (DE)

(73) Assignee: Sick AG, Waldkirch (DE)

( * ) Notice: Subject to any disclaimer, the term of this patent is extended or adjusted under 35 U.S.C. 154(b) by 126 days.

(21) Appl. No.: 12/913,216

(22) Filed: Oct. 27, 2010

(65) Prior Publication Data

US 2011/0084642 A1  Apr. 14, 2011

Related U.S. Application Data

(63) Continuation-in-part of application No. 12/897,171, filed on Oct. 4, 2010.

(30) Foreign Application Priority Data

Oct. 10, 2009 (DE) .......................... 10 2009 048 944
Oct. 11, 2010 (EP) ..................................... 10187125

(51) Int. Cl.
 *H02P 23/00* (2006.01)
(52) U.S. Cl. .................... 318/798; 318/376; 318/400.21; 318/807; 318/801; 318/254.1; 701/22; 701/84; 701/31.4; 701/41; 702/115; 702/185; 702/58.4
(58) Field of Classification Search ................. 318/798, 318/461, 489, 490, 609, 138, 524, 700, 808, 318/811, 439, 449, 801, 800, 799, 807, 727; 388/911; 702/115, 185
See application file for complete search history.

(56) References Cited

U.S. PATENT DOCUMENTS 5,796,236 A * 8/1998 Royak ........................... 318/804
6,393,373 B1 * 5/2002 Duyar et al. ................... 702/115
7,443,118 B2 * 10/2008 Kro .............................. 318/254.1
8,140,299 B2 * 3/2012 Siess ............................ 702/185

(Continued)

FOREIGN PATENT DOCUMENTS

DE  10123414 A1 * 11/2002

(Continued)

OTHER PUBLICATIONS

German Search Report issued Jul. 22, 2010, in priority German Application No. 10 2009 048 944.4.

(Continued)

*Primary Examiner* — Bentsu Ro
*Assistant Examiner* — Jorge Carrasquillo
(74) *Attorney, Agent, or Firm* — Nath, Goldberg & Meyer; Jerald L. Meyer

(57) ABSTRACT

A method and an apparatus for the failsafe monitoring of an electromotive drive without additional sensors, including a drive having a three-phase control of an electric motor, detection of the current and voltage profiles of each of the three phases, as they are forwarded to the motor by drive electronics, determination of the load speed while using the detected current and voltage values, where the determination of the load speed takes place by calculating an observer model with reference to the detected current, to the detected voltage, to the frequency preset by the control and to the characteristic data of the motor and generation of a failsafe switch signal for the motor when the calculated load speed does not correspond to a preset desired speed within the framework of preset tolerances. The load torque can also be determined and monitored with reference to the observer model.

17 Claims, 6 Drawing Sheets

U.S. PATENT DOCUMENTS

| | | | |
|---|---|---|---|
| 2007/0018603 A1 * | 1/2007 | Aleyt et al. | 318/609 |
| 2008/0265819 A1 * | 10/2008 | Chen et al. | 318/490 |
| 2009/0224707 A1 * | 9/2009 | Williams et al. | 318/400.02 |
| 2010/0194325 A1 * | 8/2010 | Dixon et al. | 318/490 |

FOREIGN PATENT DOCUMENTS

| | | |
|---|---|---|
| DE | 10226974 A1 * | 1/2004 |
| DE | 10 2005 010 854 A1 | 9/2006 |
| DE | 102005010854 A1 * | 9/2006 |
| DE | 10 2005 034 243 A1 | 1/2007 |
| EP | 1 746 717 A2 | 1/2007 |
| EP | 2 098 930 A1 | 9/2009 |
| EP | 2098930 A1 * | 9/2009 |
| WO | 2007/085331 A1 | 8/2007 |
| WO | WO 2007085331 A1 * | 8/2007 |
| WO | 2009/007681 A2 | 1/2009 |

OTHER PUBLICATIONS

European Search Report, Application No. EP 10 18 7125, mailed on Jul. 12, 2011.

* cited by examiner

METHOD AND APPARATUS FOR FAILSAFE MONITORING AN ELECTROMOTIVE DRIVE

BACKGROUND

1. Technical Field

The invention relates to a method in accordance with the preamble of claim 1 and to a corresponding apparatus.

2. Description of Related Art

The drives in question are used in industrial application in machine tools, robots, conveying plants, pumps and the like. Since there is potentially a risk for the life and health of the operator from these drives or from these machines in many applications, the drives must be secured. The measures for securing are subject to strict international and European standard provisions with respect to failure safety, reliability and the like. Specifically for electrical power drives, the standard EN 61800-5-2 "Adjustable speed electrical power drive systems; Part 5-2: Safety requirements—Functional" describes a number of drive monitoring functions with whose aid movements causing danger should be monitored and brought to a standstill in a failsafe manner. A number of other standards are likewise relevant such as the standard EN 954 "Safety related parts of control systems" and its successor standard EN 13849. In the following, the terms "failsafe" and "safe" will be used as synonyms in the meaning that the systems and activities labeled thereby are "safe" or can be carried out "safely" in accordance with the standard provisions and faults or malfunctions which could result in a danger are recognized or result in a reaction for danger reduction, as the standards require.

To satisfy the safety demands on drives, external sensors such as encoders were used as well as further sensors for determining the position, speed and torque which in turn have to satisfy different safety standards such as EN/IEC 61946 "Safety of machinery-Electro-sensitive protective equipment (ESPE)" or EN 61508 "Functional safety of electrical/electronic, programmable electronic safety-related systems".

The use of external sensors is disadvantageous since, in addition to the machine, the sensors actually have to be provided and a cabling corresponding to the safety demands has to be drawn between the switch cabinet in which the control for the machine is located and the field plane. Depending on the structure of the sensor, it can furthermore also be necessary that an additional, redundant sensor has to be installed to achieve the required fault safety of the machine. The effort and so the costs are increased by the assembly of the sensor and the cabling. The sensors which are located in the harsh field plane are at greater risk of failure due to the environmental conditions, whereby the availability of the machine is impaired.

For this reason a device was proposed in DE 10 2005 010 854 A1 to be able to dispense with the additional sensors. In accordance with the teaching of this document, a drive monitor is provided with which the speed, the torque and the direction of rotation can be determined and indeed from the current and voltage profiles such as are provided by a three-phase electronic control system to the electric motor. For this purpose, the drive monitor carries out a vector calculation of voltage U and current I and determines the speed, direction of rotation and torque of the motor from the vectorial data, in particular from the angle of the rotary electric field.

The required vector calculation is very complex and requires a large calculation capacity. The greatest restriction comprises the fact that this drive monitor is only suitable for synchronous motors and not for asynchronous motors since the determination of the speed and the direction of rotation only takes place via the angle of the rotary electric field, but the electric and dynamic properties of the asynchronous motor are neglected.

BRIEF SUMMARY

Starting from this prior art, it is the object of the invention to provide an improved method and an improved apparatus for failsafe monitoring of an electromotive drive with which in particular asynchronous motors can be monitored without additional sensors in a safety-directed manner.

This object is satisfied by a method having the features of claim 1 and by an apparatus having the features of claim 11.

The method in accordance with the invention comprises the steps:
- detecting the current and voltage profiles as they are provided to the motor by an electronic drive system;
- determining the load speed using these values;
- failsafe switching off of the drive when the calculated load speed does not correspond to a preset desired speed within the framework of preset tolerances;
- with the step of determining the load speed taking place in accordance with the invention by calculation of an observer model with reference to the detected current, the detected voltage the frequency preset by the control and the motor characteristics.

The apparatus in accordance with the invention for carrying out the method in accordance with the invention comprises corresponding means, namely means for detecting the current and voltage profiles of each of the three phases as they are provided to the motor by an electronic drive system, means for determining the load speed while using the detected current and voltage values, with the determining of the load speed taking place by calculating an observer model with reference to the detected current, to the detected voltage, to the frequency preset by the control and to the motor characteristics and means for generating a failsafe switching signal for the failsafe switching off of the motor when the calculated load speed does not correspond with a preset desired speed within the framework of preset tolerances.

A determination of the load speed by calculating an observer model requires substantially less calculation capacity and can therefore be realized in a less complex and less expensive manner since no vector calculation takes place. Instead of the vector calculation, the measured instantaneous values are used and can e.g. be calculated back to an effective value which is then used as the reference value for the comparison for the static load point on the motor characteristic. The influence of dynamic load changes is recognized by the determining of the change in the effective values of current and voltage, which is used for determining the speed and torque. The dynamic change in the frequency by the electronic control system (servo drive, frequency inverter) is recognized with reference to the increase speed of current and voltage, which can be used for calculating the frequency. Due to the orientation on the characteristics, in particular asynchronous motors can be detected more exactly. The decisive characteristic data are reconstructed from the specification plate data. They are optionally present in electronic form and can be read in. Such a determination of the load speed is also more stable since effective values can be taken.

The following drive monitoring functions can thus be realized which are required by the standard and are defined there:
- Safe Stop 1 (SS1)
- Safely-limited acceleration (SLA)
- Safe acceleration range (SAR)
- Safely-limited speed (SLS)

Safe speed range (SSR)
Safely-limited torque (SLT)
Safe torque range (STR)
Safely-limited increment (SLI)
Safe direction (SDI)
Safe brake control (SBC)
Safe speed monitor (SSM)

In this respect, the advantages of a monitoring without external sensors are maintained such as low costs, no mechanical attachments, little cabling effort, avoidance of error sources which could result from additional sensors, reduction in the project planning effort. No sensors have to be installed in the field plane, whereby the failure safety is increased. The monitoring in accordance with the invention can be simply integrated into a safety architecture. Overall, a higher availability of the machine can be achieved with the method and apparatus in accordance with the invention.

In the case of an asynchronous motor, the load speed can be stored as characteristic data in a first embodiment with reference to the formula $$n_L = \frac{1}{p} * f_{FU} * 60 \text{ s/min} - \frac{I_{mess}}{I_n} * \frac{f_{FU}}{U_{mess}} * \frac{U_N}{f_N} * (n_{syn} - n_n)$$

where
$I_n$ nominal current
$f_N$ nominal frequency
$U_N$ nominal voltage
$n_{syn}$ synchronous speed
$n_n$ nominal speed
$n_L$ load speed
p pole pair number
as is described in detail further below. Such a determination represents a relatively simple model for an asynchronous motor and can be calculated fast and with little effort. This relatively simple model includes simplifying assumptions which are, however, always in the "safe" range in the sense of functional safety due to the physical circumstances, as will be explained in detail further below with reference to this embodiment.

In this simplified model, the load torque can furthermore be determined in a simple manner from the detected current and the characteristic data for the nominal torque and the nominal current so that the load torque is monitored and so that a failsafe switching off can take place e.g. on a blockage of the motor and thus an exceeding of a limit value.

In a second embodiment, the load speed is likewise determined for the case of an asynchronous motor with reference to the formula $$n = n_{syn}(1-s)$$

with $n_{syn}$ being the synchronous speed and s being the slip.

This observation model is based on more detailed assumptions which are taken into the calculation of the slip s so that it is more exact and produces more exact values with respect to the first embodiment.

The slip is advantageously calculated from the effective values of current and voltage, the rotor resistance and the leakage inductance, with the calculation being based on the known T equivalent circuit model for an asynchronous machine.

The tilting moment $M_k$ and the tilting slip $s_k$ can then be calculated from the characteristic data in a simple manner and the load torque $M_L$ can be determined from this, together with the slip s, with the help of Kloss' formula. When the load torque $M_L$ exceeds a limit value, a failsafe switching off takes place.

Synchronous motors can also be monitored with respect to the load speed and the load torque using the method and apparatus in accordance with the invention. The synchronous machine works without slip; the measurement of the starting frequency $f_{FU}$ of the frequency inverter of the drive electronics is therefore sufficient here as a criterion for the safe speed detection. For the case that the rotor is not carried along by the rotary stator field, i.e. if the rotor does not rotate at the stator frequency the machine is not guided cleanly. This case, however, does not represent a critical case under the aspect of functional safety since the load speed is smaller here than the load speed determined by the apparatus.

$$n_L = \frac{1}{p} * f_{FU} * 60 \text{ s/min}$$

therefore applies.

The synchronous machine can output a constant load torque from speed n=0 up to the synchronous speed. The load torque is proportional to the input current outside the saturation of the machine. The synchronous machine should not be operated in the range of saturation, but does not represent a critical case from the aspect of the functional safety since the load torque increases less in saturation than the input current.

$$M_L = M_n * \frac{I_{mess}}{I_n}$$

thus applies for the safe determination of the load torque.

The calculation of the observer model advantageously takes place in a microprocessor. Provision is made for this purpose that the detected current and voltage signals are adapted for the microprocessor evaluation, with the signals being converted into ranges compatible for microprocessors, e.g. 3.3 V or 5 V.

If, in the case of the monitoring of a synchronous or asynchronous motor, the voltages and currents of all three phases are detected with corresponding means, the third voltage or the third current can respectively be calculated from two voltages or two currents respectively since $\Sigma U=0$ and $\Sigma I=0$ applies to the synchronous motor and to the asynchronous motor. The calculated parameters can be compared with the measured values and can thus detect line breaks, short-circuits, shorting, phase failure and the like via a tolerance limit on deviations. If such an error is recognized, a failsafe switching off takes place via the means for switching off.

A monitoring of a synchronous or asynchronous motor can then not only take place when it is running in motor operation, but also in generator operation, for which purpose, in a further development of the invention, means are provided for the recognition of the motor or generator operating mode. These means recognize the operating mode via the phase angle between the current and the voltage since the current is then opposite in phase to the voltage.

In a further development of the invention, means are provided for determining the direction of rotation which determine the direction of rotation from the phase sequence of the three phases and a failsafe switching off takes place on deviation from a desired direction of rotation so that a monitoring of the direction of rotation is also possible.

To achieve a required safety category in accordance with the standards, a two-channel design is advantageously provided, with in particular two redundant microprocessors being used which are diverse and/or on which diverse algorithms run. On faults in a channel or on a failure of the channel, the other channel can effect a switching off, with the two microprocessors being able to monitor one another in that, for example, their results are permanently compared with one another.

BRIEF DESCRIPTION OF THE DRAWINGS

The invention will be explained in detail in the following with reference to an embodiment and to the drawing. There are shown in the drawing.

DETAILED DESCRIPTION

Figure 5:
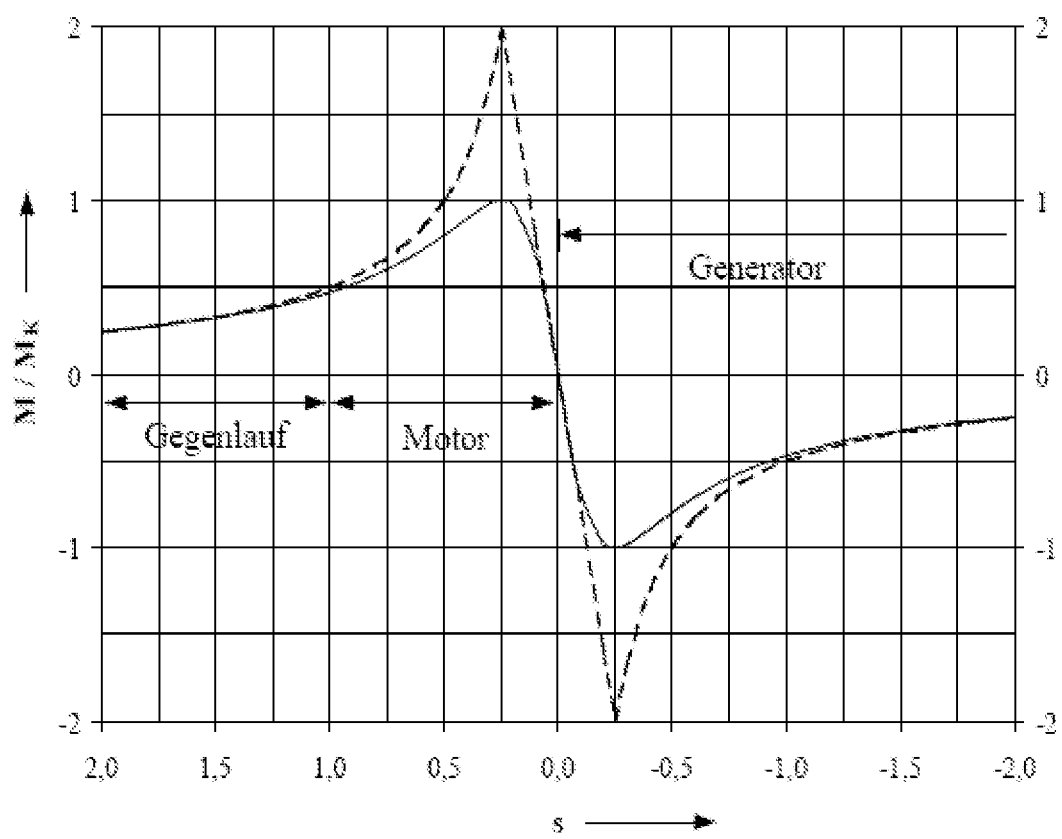
FIG. 5 profile of the torque of an asynchronous machine in accordance with Kloss formula.

A typical characteristic is shown by a solid line in FIG. 5. In addition, a model profile is shown by a dashed line from which it can be recognized that the model properly describes the behavior of the asynchronous machine, but has weaknesses in the region in which the torque reaches the tilting torque.

In the following, two embodiments of the invention will be described which both describe an asynchronous machine. The first embodiment starts from a linearized observer model and therefore gives a sufficiently good reproduction of the characteristic profile only in the region far below the tilting slip, i.e. up to a maximum of double the nominal current of the motor. The second embodiment is more complex in calculation, but reproduces the characteristic profile correctly in a larger range. It is based on the T equivalent circuit model and describes the motor on both sides of the tilting point. It thus has a larger scope and is correspondingly more exact.

Figure 1:
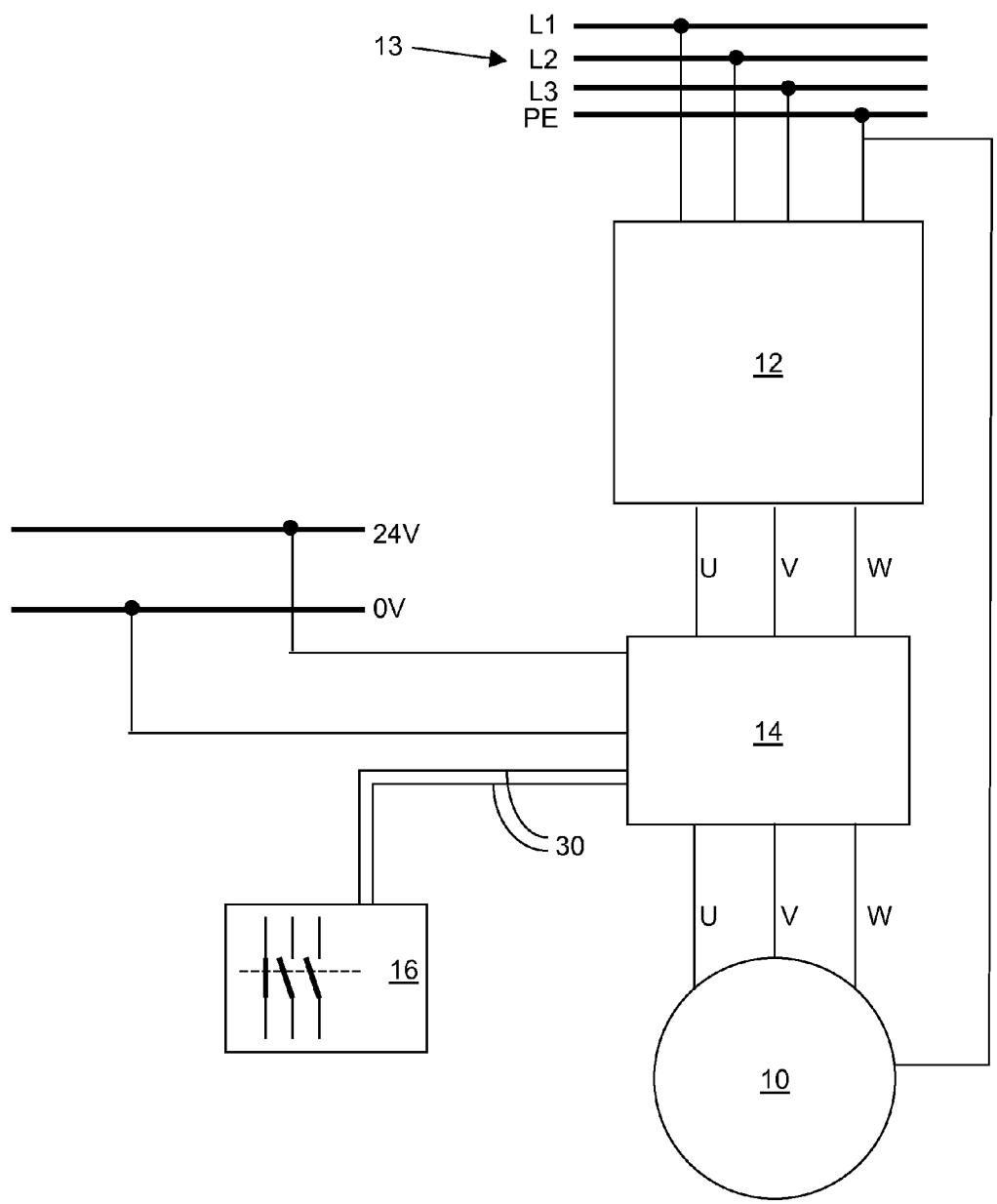
FIG. 1 an electric motor with a control and an apparatus in accordance with the invention for monitoring.
Figure 2:
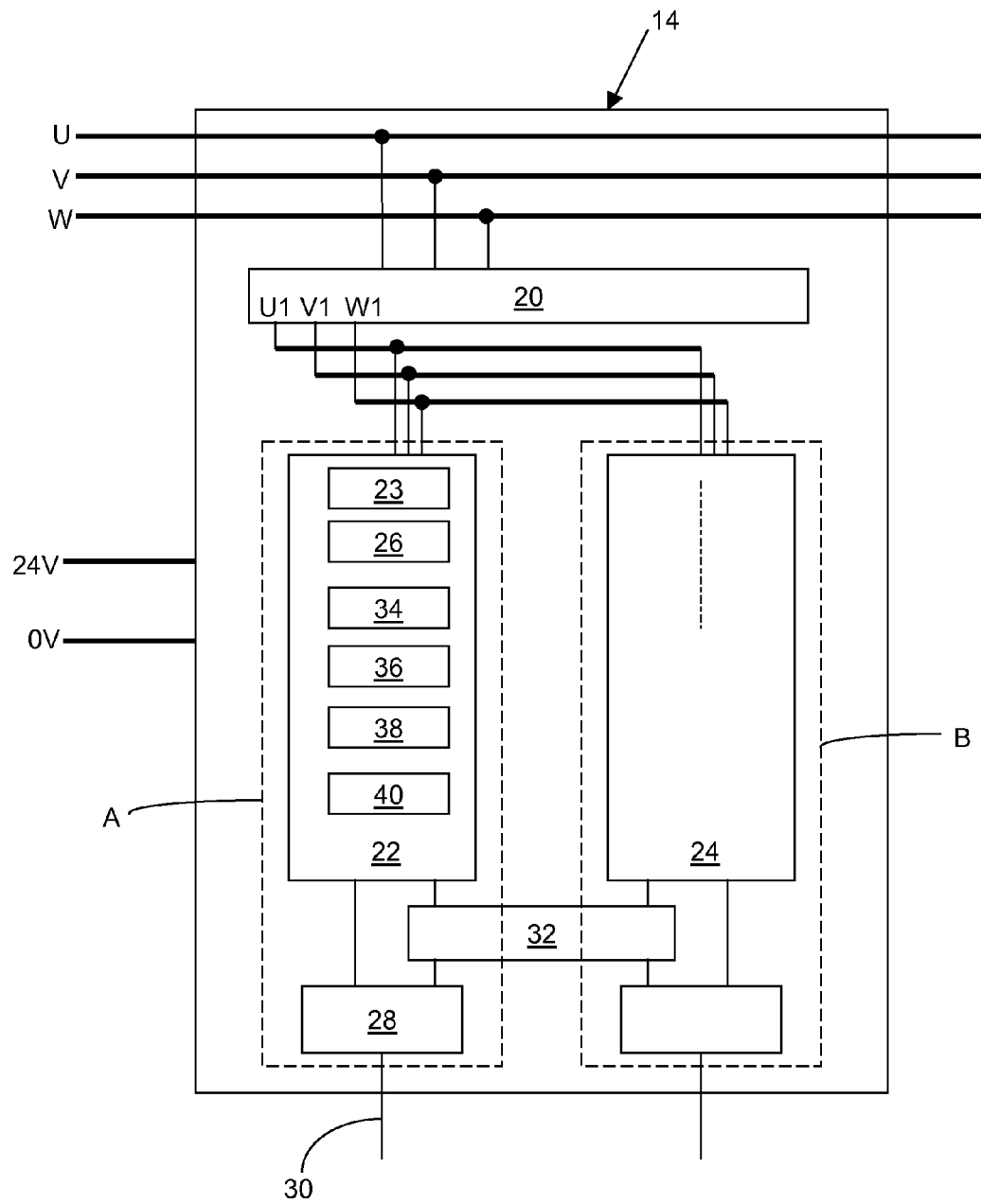
FIG. 2 a schematic block diagram of the apparatus in accordance with the invention.

An electromotive drive, namely an electric motor 10, is shown in FIG. 1. The electric motor 10 is controlled in three phases by drive electronics 12 with the motor phases U, V, W. The drive electronics 12 are supplied by a three-phase supply line 14 with the phases L1, L2, L3 and grounding line PE. The drive electronics 12 include a frequency inverter, which delivers a frequency $f_{FU}$ to control the electric motor 10, which is preferably an asynchronous motor, with the current and voltage signals being present at the three motor phases U, V, W as pulse width modulated signals.

The apparatus 14 in accordance with the invention for the failsafe monitoring of the drive of the electric motor 10 is arranged between the electric motor 10 and the drive electronics 12. The current and voltage profiles on the three motor phases U, V, W are detected using the apparatus 14 and at least the load speed or the load torque of the electric motor 10 is determined from them, as will be described further below with reference to the two embodiments already addressed. When the load speed thus determined does not correspond with a preset desired speed within the framework of preset tolerances, the drive and thus the electric motor is switched off via corresponding switching means 16, for example a motor gate. The apparatus 14 requires a corresponding voltage supply of, for example, 24 V for the technical safety evaluation in the apparatus 14 and for the activation of safety switching signals.

The apparatus 14 and the method in accordance with the invention for the failsafe monitoring of the electric motor 10 will be described in detail in the following.

The apparatus 14 has means 20 for detecting the current and voltage profiles of each of the three phases U, V, W, as they are provided to the motor 10 by the drive electronics 12. The phases U, V, W present as pulse width modulated signals are galvanically decoupled using these means 20 and are converted to the level of the subsequent evaluation, e.g. 3.3 V or 5V. The signals U1, V1, W1 thus adapted are evaluated in two parallel channels A and B.

The two channels A and B each in particular include one microprocessor 22 and 24 respectively so that an identical evaluation takes place in both channels by means of algorithms which are the same or diverse so that in the following only one of the channels, namely A, will be described in more detail.

First, the converted signals U1, V1, W1 or the current and voltage values contained therein are detected and prepared for the following evaluation. The voltage measurement takes place between the terminals U1, V1 and W1 of the motor. For the voltage measurement, the apparatus 14 in accordance with the invention recognizes with reference to the signal profile whether the connected motor 10 is supplied by a continuous signal or a clocked signal. With continuous voltages, an analog/digital converter integrated in the microprocessor 22 measures the value at constant time intervals.

If the voltages are applied to the three motor phases U1, V1, W1 as pulse width modulated signals, the flanks of the clocked signals are used as switch on and switch off triggers for a forward and backward counter. For this purpose, the circumstance applies that incrementation takes place at a voltage greater than 0 and decrementation takes place at a voltage less than 0. The count of the forward/backward counter is read out at a constant time interval and is put in relationship with the timer value, whereby the continuous profile of the voltage can be mapped.

$$U_{kont} = \frac{Z}{T} k_{tz} * U_N$$

where
$U_N$ nominal voltage
$U_{kont}$ continuous voltage
T time value
Z counter value
$K_{tz}$ factor to adapt the counter and the timer For the current measurement, an analog-digital converter integrated in the microcontroller measures the value of the phase currents at constant intervals with continuous voltages via a measurement transformer.

With clocked phase voltages, the phase currents are likewise clocked, but heavily smoothed by the inductances of the motor. These phase currents are determined via the measurement transformer and an analog-digital converter integrated in the microcontroller. The flanks detected by the voltage measurement can optionally be used as a trigger signal for the analog-digital converter to increase the quality of the current measurement.

The measured voltages and currents have to be prepared in a preparation unit 23 for the further processing in the microprocessor 22. For this purpose, the effective values of the current and the voltage are determined to be able to consider the observation models described further below in the stationary sate. The preparation of the measured values of current and voltage is furthermore necessary since the determination of the frequency and of the effective value is not possible without this.

The following consideration for the preparation of the measured values applies to currents and voltages equally.

With sine values, the increase at a point depends on the frequency and the amplitude. Since, unlike with a frequency inverter, there is no influence on a variable, it cannot be ensured whether the amplitude or the frequency of the measurement parameter has changed. It is thus necessary to calculate a sine value standardized to "1".

The effective value is obtained in that the values of the three phases are added at a measurement point and the floating mean value is determined therefrom. The effective value can be determined in a simple manner therefrom in dependence on the number of measurement points.

The phase angle α can be determined from an individual value of a phase and from the effective value and, with this and the time interval between two measurements, the rotor frequency $f_{sync}$.

The effective value of the current $I_{eff}$ or voltage $U_{eff}$ and $n_{syn}$ represent a time offset to the actual system parameter, with the offset depending on the number of the measurement points used for the mean value formation. The number of measurement points must therefore be selected so that the time offset does not become too large, but that the detection of the measured parameters is still stable.

If the measured values have been prepared in this manner in the preparation unit 23 of the microprocessor 22, the load speed $n_L$ is determined by calculation of an observer model using means 26 for determining the load speed $n_L$ of the motor 10 while using the detected and prepared measured values and the inverter frequency $f_{FU}$ preset by the control and corresponding to the stator frequency $f_{sync}$ and using the characteristic data of the motor 10.

Figure 4:
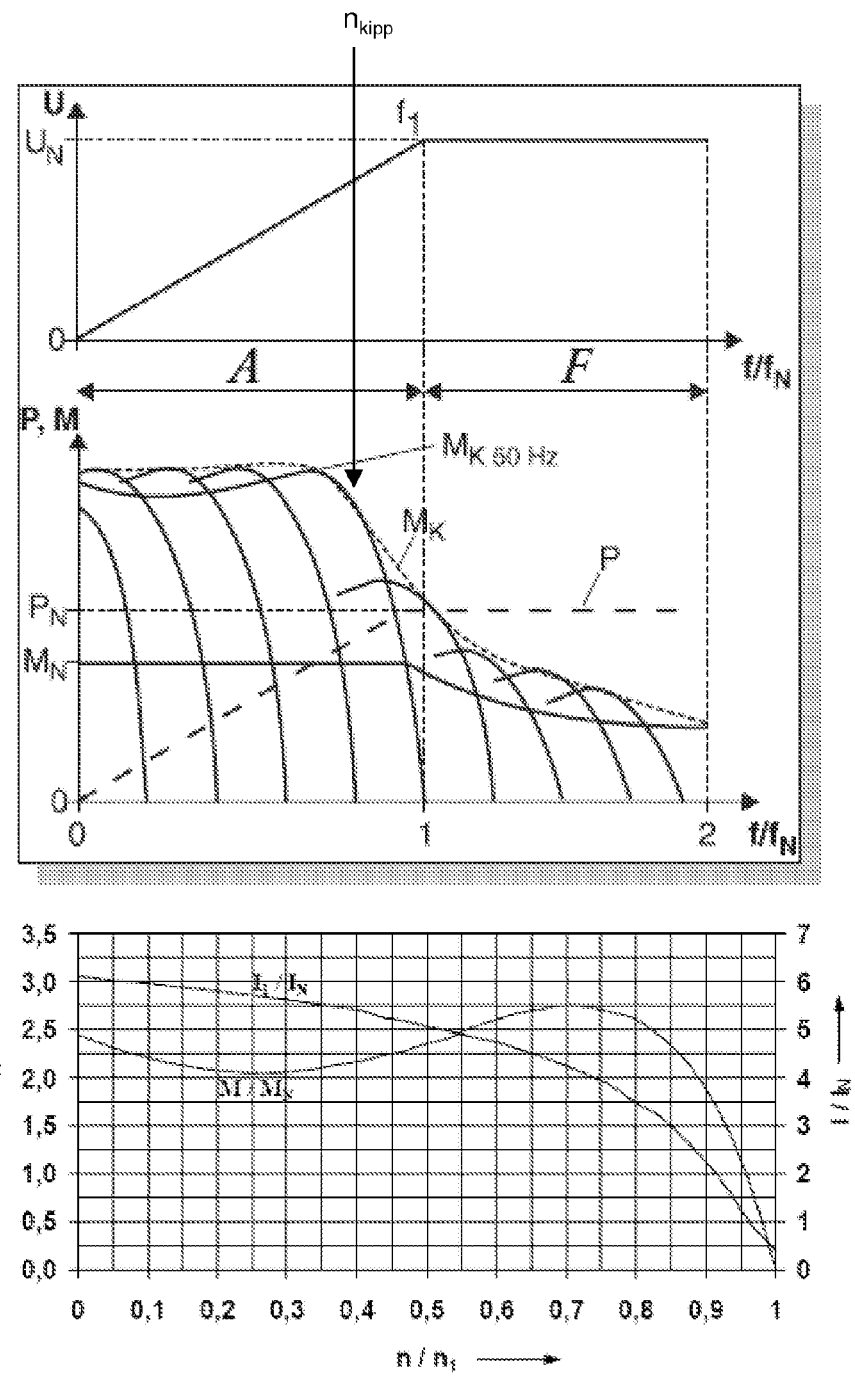
FIG. 4 different characteristics of asynchronous machines.

A first embodiment is based on a first observer model in which the load speed is calculated using the detected current and voltage values in accordance with the formula (1).

$$n_L = \frac{1}{p} * f_{FU} * 60 \text{ s/min} - \frac{I_{mess}}{I_n} * \frac{f_{FU}}{U_{mess}} * \frac{U_N}{f_N} * (n_{syn} - n_n) \quad (1)$$

where:
$n_L$ load speed
$f_{FU}$ starting frequency of the frequency inverter
$I_{mess}$ effective value of the current
$I_n$ nominal current
$U_{mess}$ effective value of the voltage
$f_N$ nominal frequency
$U_N$ nominal voltage
$n_{syn}$ synchronous speed
$n_n$ nominal speed
p pole pair number How and under which assumptions this formula (1) is derived will be explained in the following:

The starting frequency of the frequency inverter $f_{FU}$ determines the load speed of the motor. The voltage and the frequency behave proportionally to one another in the control characteristic of the motor. Such a control characteristic is shown in FIG. 4 together with typical characteristics of asynchronous machines. The "natural" speed-torque characteristic above the tilting speed $n_{kipp}$ is the working characteristic of the drive in mains operation. This characteristic is displaced on operation at the frequency inverter as the frequency falls. If the motor is operated at a 50 Hz mains, the frequency f is fixed and the motor can output the torque $M_{kipp}$ at a maximum. In this process, the rotor speed falls down to $n_{kipp}$.

Due to the above described behavior, the following is true for the asynchronous machine:

$$n_L = n_{el} - \frac{M_L}{M_n}(n_{syn} - n_n)$$

$$n_{el} = \frac{1}{p} * f_{FU} * 60 \text{ s/min}$$

with
$n_{el}$: rotary speed of the electrical rotary field
$M_L$: load torque
$M_n$: nominal torque The stator current, that is that current which the frequency inverter has to drive, increases almost linearly in the vicinity where $M_L/M_n$=0.4 to 1.6. The current increases overproportionally to the load torque $M_L$ above this. It is thus ensured that, on the determination of the load torque $M_L$ from the measured current $I_{mess}$, the resulting derived load torque $M_L$ is always lower than that which is adopted at a maximum at the motor shaft. The resulting load torque $M_L$ and the load speed $n_L$ are thus always to be considered safe in the sense of functional safety.

This behavior which is illustrated in FIG. 4 and the circumstance that frequency inverters can typically only output double the nominal current $I_n$ only for 60 sec in industrial drive engineering allow the use of the following relationship
$I_{mess}$: gemessener Strom
$I_n$: Nennstrom $$M_L = M_n * \frac{I_{mess}}{I_n}$$

Therefore, the rotary speed can be calculated as:

$$n_L = \frac{1}{p} * f_{FU} * 60 \text{ s/min} - \frac{M_n * \frac{I_{mess}}{I_n}}{M_n} * (n_{syn} - n_n)$$

$$n_L = \frac{1}{p} * f_{FU} * 60 \text{ s/min} - \frac{I_{mess}}{I_n} * (n_{syn} - n_n)$$

The following quantities are determined by the construction of the asynchronous machine:
$n_{syn}$
$n_n$
$I_n$ The following quantities are measured in the apparatus 14:
$I_{mess}$
$f_{FU}$ The above described relation between torque and current $$M_L = M_n * \frac{I_{mess}}{I_n}$$

can be used to make sure that a predetermined threshold for the torque won't be exceeded. The measured current is used to determine the torque.

The following quantities are determined by the construction of the asynchronous machine:

$M_n$ $I_n$ $I_{mess}$ is measured in apparatus 14.

The influence of the flow reduction should furthermore also be taken into account. Modern frequency inverters lower the magnetic flux in the part load range of the machine to reduce the electric energy. This lowering is achieved by lowering the start voltage. This means a lowering of the tilting torque $M_{kipp}$ with an unchanging tilting speed $n_{kipp}$ and thus an unchanging tilting frequency $f_{kipp}$. The apparatus 14 recognizes this in that the ratio $U/f_{FU}$ is no longer proportional. This has the consequence that the working characteristic of the asynchronous motor has a smaller increase. The factor $$\frac{f_{FU}}{U_{mess}} * \frac{U_N}{f_N}$$

takes this into account.

The equation (1) thus results overall for the calculation of the load speed $n_L$ so that the load speed $n_L$ can be calculated with (1) from the measurement parameters $f_{FU}$, $I_{mess}$ and $U_{mess}$ and from the characteristic data. The load speed is always safe with the considerations listed above, i.e. the actual speed of the shaft of the electric motor cannot exceed the calculated load speed.

A check is made in the microprocessor 22 whether the load speed $n_L$ thus determined corresponds to a preset desired speed within the framework of preset tolerances. If this is not the case, a malfunction is present and a safety switch signal 30 is output by means 28 for generating a failsafe switch signal. This safety switch signal 30 can trigger the switching means 16 for switching off the motor 10.

Furthermore, in this first embodiment, the load torque $M_L$ can be determined using means 34 for determining the load torque $M_L$ in accordance with equation (2) below from the detected current $I_{mess}$ and the characteristic data for the nominal torque $M_n$ and for the nominal current $I_n$ so that a failsafe switching off can take place e.g. on a blockage of the motor and thus an exceeding of a preset upper limit for the torque.

The stator current, that is that current which the frequency inverter has to drive, increases almost linearly up to 1.5 times the nominal torque $M_n$ in the asynchronous motors which are usually used in industrial drive engineering. The current increases overproportionally to the load moment above this. It is thus ensured that, on the determination of the load torque $M_L$ from the measured current $I_{mess}$, the resulting derived load torque $M_L$ is always lower than that which is adopted at a maximum at the motor shaft. The resulting load torque $M_L$ and the load speed $n_L$ are thus always to be considered safe in the sense of functional safety. This behavior and the circumstance that frequency inverters can typically only output double the nominal current $I_n$ only for 60 sec in industrial drive engineering allow the use of the following relationship $$M_L = M_n * \frac{I_{mess}}{I_n} * \frac{U_{mess}}{f_{FU}} * \frac{f_N}{U_N} \tag{2}$$

Figure 6:
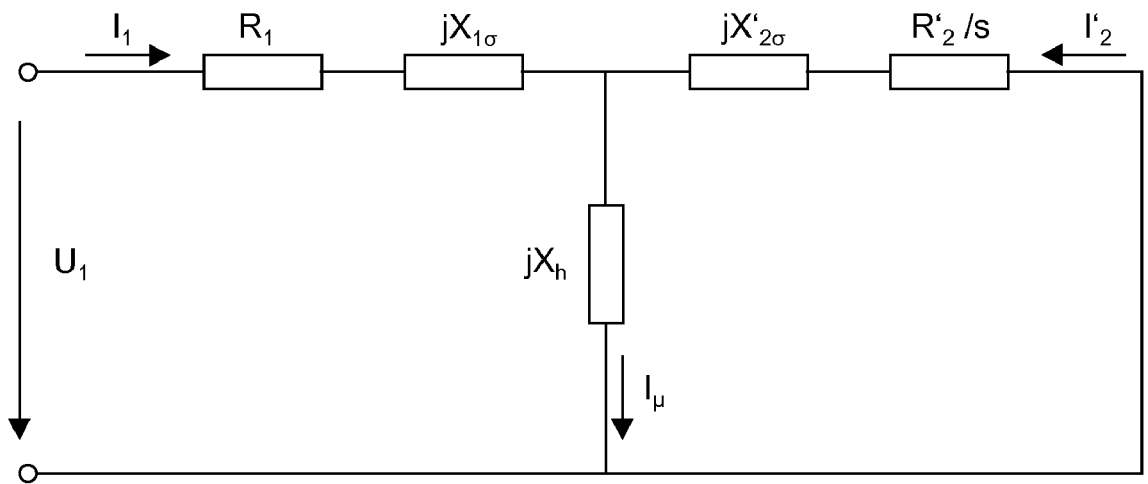
FIG. 6 simplified T equivalent circuit model of the asynchronous machine.

In a second embodiment, the calculation of the load speed takes place with reference to another observer model which is based on the T equivalent circuit model of the asynchronous machine such as is shown in FIG. 6. Equation (3) is used for determining the tilting moment. The machine parameters required for this purpose can be calculated with reference to the specification plate data in accordance with a method which is also described in Nguyen Phung Quang, Jörg-Andreas Dittrich, "Praxis der feldorientierten Drehstromantriebsregelung" [Practice of field-orientated three-phase current drive regulation", Chapter 6.3.1, Berechnung mit Leistungsfaktor [Calculation with power factor] Cos(phi) at ASM, page 168. If these parameters are known, the equations shown in the following can be used to calculate the speed and torque.

$$M_k = \frac{p * U_{mess}^2}{4 * \pi * f_{FU} * X_\sigma} \tag{3}$$

p pole pair number $X_\sigma$ leakage inductance

The slip s is then calculated on the basis of the T equivalent circuit model as $$s = \frac{R_r * K'}{\sqrt{\left(\frac{U_{mess}}{I_{mess}}\right)^2 - X_\sigma^2}} \tag{4}$$

where $R_r$ is the rotor resistance. For the real application a correction factor K was introduced in order to compensate deviations in the nominal duty point.

The load $n_L$ can thus be calculated according to $$n_L = n_{syn}(1-s) \tag{5}$$

The load $M_L$ can then be determined in a simple manner from the Kloss formulae, with $$s_k = \frac{R_r'}{X_\sigma} \tag{6}$$

and $$M_L = \frac{2 * M_k}{\frac{s}{s_k} + \frac{s_k}{s}} \tag{7}$$

As in the first embodiment, a check is made in the microprocessor 22 whether the load speed $n_L$ thus determined corresponds to the preset desired speed within the framework of preset tolerances and optionally the safety switch signal 30 is output. The same applies to the monitoring of the load torque $M_L$. This second variant has the substantial advantage that it is supported on more precise machine parameters and can also recognize the tilting of the asynchronous machine with reference to the tilting slip. The restriction is thus omitted here that it can only be used up to double the nominal motor current.

Both embodiments now again share the feature that the same process also takes place in channel B. In addition, each microprocessor 22 and 24 provides its result to a comparator unit 32 in which the results of both microprocessors are compared with one another. If a deviation is present, the comparator unit 32 can also control the switch generating means 28 of both channels to output a safety switching signal 30.

On the current detection necessary for the torque determination, it can be advantageous to fix a limit value for the summed instantaneous values for the currents to ensure that a fast switching off takes place on the formation of too high a torque.

In another embodiment of the invention, the first observer model can be calculated on the first microprocessor 22 and the second observer model on the second microprocessor 24, or vice versa. An even greater diversity would thus be created to increase safety. It must, however, be taken into account that the microprocessor which would calculate the second observer model also realizes the tilting monitoring since this cannot be done by other models.

Furthermore, in both embodiments, means 36 can be provided for the consistency check of the voltages and currents with which the third voltage and the third current respectively are calculated from two voltages and currents respectively in accordance with $\Sigma U=0$ and $\Sigma I=0$ respectively. On deviations of a calculated voltage value or current value with the correspondingly directly detected voltage value or current value, a malfunction is present such as a line break, short circuit, shorting, phase failure, or the like and the switch generating means 28 are activated. The voltages at the motor phases are therefore measured against one another and not against the neutral conductor. Since the phasing measured between outer conductor to outer conductor and outer conductor to neutral conductor is known, this can be used to again calculate back to the voltage relationships outer conductor to neutral conductor.

Since two of the three measured values for current and voltage are used to calculate a reference value for the third measured value, the means 20 for detecting the currents and voltages do not have to be made redundant. If the reference value and the measured value are different, a switch to the safe state is made. A certain redundancy in the measurement system is already present by this two-from-three process.

Furthermore, means 38 are provided for determining the direction of rotation. These means 38 determine the sequence of the three phases U1, V1, W1 from which the direction of rotation can be determined. On deviation from a desired direction of rotation, an activation of the switch signal generating means 28 takes place and thus a failsafe switching off of the motor 10.

With knowledge of the characteristic profiles of the asynchronous motor 10, the generator operation can also be recognized using means 40 for recognizing the operating mode. In generator-led operation, the speed and thus the delay can thus be fixed at the frequency inverter of the drive electronics 12. With a hard switching off, the arising remanence voltage can be used to determine the runout of the machine.

As can be seen from the curve profile of a typical torque profile shown in FIG. 5, an asynchronous machine in generator operation has almost identical characteristics as in motor operation, with the profile being mirrored in another quadrant. This means that the above-named conditions also apply to generator operation which describes a braking process. The means 40 in this respect recognize the operating mode via the phase angle between the current and the voltage. The current changes its sign and thus its direction in generator operation and is in the opposite phase to the voltage.

Generator operation is also recognized for the synchronous machine. The recognition takes place with reference to the phasing between the current and the voltage at the motor terminal conductors.

Figure 3:
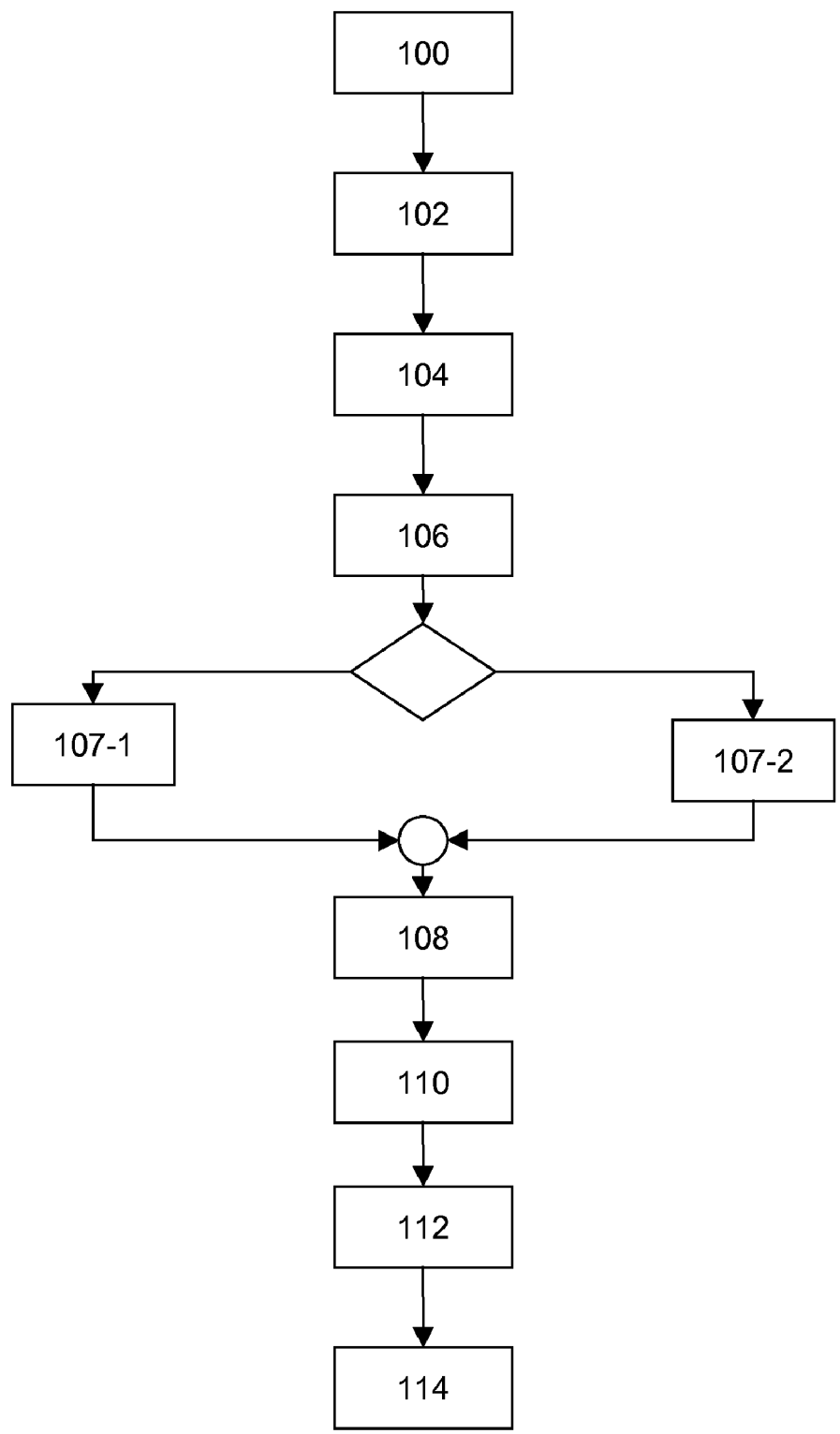
FIG. 3 a schematic flowchart of the method in accordance with the invention.

In the following, the total procedure of the monitoring of the asynchronous motor 10 will be summarized again with reference to the flow chart of FIG. 3.

In a first step 100, the current and voltage profiles are detected.

In a next step 102, continuous signals are generated by means of the above-described measurement method from the clocked pulse width modulated signals to obtain those signals which the motor 10 ultimately "sees". In this step, the effective values of current and voltage are also determined from a floating mean value formation.

In step 104, the consistency check takes place, and thus the recognition of faults such as line breaks, short circuits, shorting or the like.

In step 106, the operating mode is determined. If a generator operating mode is present, the generator characteristic is used in step 107-2. In the other case, when a motor operation takes place, the motor characteristic is alternatively used in step 107-1.

Then, in step 108, the direction of rotation can be determined from the phase sequence.

Then, in step 110, the determination of the speed takes place in the manner described above, namely ultimately while using an observer model from the frequency of the frequency inverter and the currents and voltages at the electric motor.

In step 112, the torque is determined and in step 114, finally, all the data are brought together, which has the result whether a safety switch signal is generated or not.

Synchronous motors can also be monitored with respect to the load speed and load torque with the apparatus 14 in accordance with the invention and the method in accordance with the invention.

The synchronous machine works without slip so that here the measurement of the output frequency $f_{FU}$ of the frequency inverter of the drive electronics is sufficient as the criterion for the safe speed detection. For the case that the rotor is not carried along by the rotary stator field, i.e. if the rotor does not rotate at the stator frequency the machine is not guided cleanly. This case, however, does not represent a critical case $$n_L = \frac{1}{p} * f_{FU} * 60 \text{ s/min} \tag{8}$$

under the aspect of functional safety since the load speed is smaller here than the load speed determined by the apparatus 14.

therefore applies

The synchronous machine can output a constant load torque from speed=0 up to the synchronous speed. The load torque is proportional to the input current outside the saturation of the machine. The synchronous machine should not be operated in the range of saturation, but does not $$M_L = M_n * \frac{I_{mess}}{I_n} \tag{9}$$

represent a critical case from the aspect of the functional safety since the load torque increases less in saturation than the input current.

thus applies for the safe determination of the load torque.

The invention claimed is:

1. A method for failsafe monitoring of a motor (10) with a three-phase control comprising the steps:
   detecting current and voltage profiles, as provided to a motor (10) by drive electronics (12);
   determining a load speed ($n_L$) of the motor (10) using the detected current and voltage profiles; and
   failsafe switching off of the motor (10) when the determined load speed ($n_L$) does not correspond to a preset desired speed within a framework of preset tolerances;
   wherein the step of determining the load speed ($n_L$) takes place by calculating an observer model with reference to the detected current profile ($I_{mess}$, $I_{eff}$), to the detected voltage profile ($U_{mess}$, $U_{eff}$), to a frequency ($f_{FU}$, $f_{sync}$) preset by the three-phase control and characteristic data of the motor (10);
   wherein the motor is an asynchronous motor and determining the load speed determination takes place with reference to the formula:

$$n_L = \frac{1}{p} * f_{FU} * 60 \text{ s/min} - \frac{I_{mess}}{I_n} * \frac{f_{FU}}{U_{mess}} * \frac{U_N}{f_N} * (n_{syn} - n_n)$$

and
where
   $I_n$ nominal current,
   $f_N$ nominal frequency,
   $U_N$ nominal voltage,
   $n_{syn}$ synchronous speed,
   $n_n$ nominal speed,
   $n_L$ load speed, and
   p pole pair number
are stored as the characteristic data of the motor (10).

2. The method in accordance with claim 1, wherein the load torque ($M_L$) is determined from the detected current ($I_{mess}$) and the characteristic data for the nominal torque ($M_n$) and for the nominal current ($I_n$) and the failsafe switching off takes place on exceeding a limit value.

3. The method in accordance with claim 1, wherein the slip is calculated from the detected current and voltage profiles, rotor resistance and leakage inductance.

4. The method in accordance with claim 1, wherein the load speed determination takes place with reference to the formula $n_L = f_{FU} * 60$ s/min.

5. The method in accordance with claim 1, wherein the calculation of the observer model takes place in a microprocessor (22, 24) and the detected current and voltage profiles are adapted for a microprocessor evaluation.

6. The method in accordance with claim 1, wherein the voltages and currents of all three phases are detected and the third voltage and the third current respectively is determined from the respective voltages and currents in accordance with ΣU=0 and ΣI=0 respectively and exceeding the limit value comprises a deviations of a calculated value from the corresponding measured value.

7. The method in accordance with claim 1, characterized in that a motor or a generator operating mode is recognized via a phase angle between the detected current and voltage profiles.

8. The method in accordance with claim 1, wherein the direction of rotation is determined from the phase sequence of the three phases (U, V, W) and exceeding the limit value comprises a deviation from a desired direction of rotation.

9. An apparatus for the failsafe monitoring of a motor (10) with a three-phase control of an electric motor, the apparatus comprising:
   means (20) for detecting current and voltage profiles of each of the three phases (U, V, W) as provided to the motor (10) by drive electronics (12);
   means (26) for determining a load speed ($n_L$) of the motor while using the detected current ($I_{mess}$, $I_{eff}$) and the detected voltage profiles ($U_{mess}$, $U_{eff}$);
   herein the determination of the load speed ($n_L$) takes place by calculating an observer model with reference to the detected current profile, to the detected voltage profile, to a frequency ($f_{FU}$) preset by the three-phase control and to characteristic data of the motor (10) in accordance with the following formula:

$$n_L = \frac{1}{p} * f_{FU} * 60 \text{ s/min} - \frac{I_{mess}}{I_n} * \frac{f_{FU}}{U_{mess}} * \frac{U_N}{f_N} * (n_{syn} - n_n)$$

means (28) for generating a failsafe switching signal (30) for the motor (10) when the calculated load speed ($n_L$) does not correspond to a preset desired speed within a framework of preset tolerances; and
   wherein the apparatus further comprises two redundant microprocessors (22, 24) being provided on which diverse algorithms run.

10. The apparatus in accordance with claim 9, wherein the apparatus has means (20) for adapting the detected current and voltage signals to the microprocessor evaluation.

11. The apparatus in accordance with claim 9, wherein means (38) for determining the load torque ($M_L$) are provided which determine the load torque ($M_L$) from the detected current (Imess, Ieff) and from the detected voltage (Umess, Ueff) and from the characteristic data and the failsafe switching off takes place on exceeding a limit value.

12. The apparatus in accordance with claim 11, wherein the means (20) for detecting the current and voltage profiles detect all three phases (U, V, W) and means (34) for consistency checking of the voltages and currents are provided with which the third voltage and the third current respectively can be calculated from two respective voltages and two respective currents in accordance with ΣU=0 and ΣI=0 respectively and the failsafe switching signal takes place on deviations of a calculated value from the corresponding measured value.

13. The apparatus in accordance with claim 11, wherein means (40) are provided for recognizing the operating mode to recognize whether a motor or a generator operating mode is present.

14. The apparatus in accordance with claim 11, wherein means (36) for determining the direction of rotation are provided which determine the direction of rotation from the phase sequence of the three phases (U, V, W) and a failsafe switching off takes place on a deviation from a desired direction of rotation.

15. The apparatus in accordance with claim 9, wherein in that the means (20) for detecting the current and voltage profiles detect all three phases (U, V, W) and means (34) for consistency checking of the voltages and currents are provided with which the third voltage and the third current respectively can be calculated from two respective voltages and two respective currents in accordance with ΣU=0 and ΣI=0 respectively and the failsafe switching signal takes place on deviations of a calculated value from the corresponding measured value.

16. The apparatus in accordance with claim 9 wherein means (40) are provided for recognizing the operating mode to recognize whether a motor or a generator operating mode is present.

17. The apparatus in accordance with claim 9, wherein means (36) for determining the direction of rotation are provided which determine the direction of rotation from the phase sequence of the three phases (U, V, W) and a failsafe switching off takes place on a deviation from a desired direction of rotation.

* * * * *